United States Patent Office 3,651,144
Patented Mar. 21, 1972

3,651,144
PRODUCTION OF ALKANOLAMINES
John B. Tindall, 448 Osborne St.,
Terre Haute, Ind. 47802
No Drawing. Filed June 6, 1969, Ser. No. 831,246
Int. Cl. C07c 85/10, 89/00, 89/04
U.S. Cl. 260—584 R                                    1 Claim

ABSTRACT OF THE DISCLOSURE

The alkanolamines 2-amino-1-butanol and 2-amino-2-ethyl-1,3-propanediol are produced simultaneously in good yield and quality in a process wherein 1-nitropropane is reacted with formaldehyde in a mole ratio of about 0.7 to about 0.9, reducing the nitroalkanols so obtained and separating the alkanolamines.

BACKGROUND OF THE INVENTION

This invention relates to the production of alkanolamines. In a particular aspect, this invention relates to the simultaneous production of 2-nitro-1-butanol and 2-nitro-2-ethyl-1,3-propanediol and reduction thereof to their corresponding alkanolamine derivatives.

It is known from the prior art to produce 2-nitro-1-butanol and 2-nitro-2-ethyl-1,3-propanediol from 1-nitropropane and formaldehyde in the presence of an alkaline catalyst, viz.

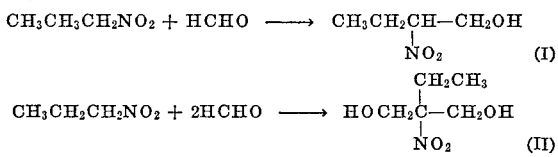

It is known from H. B. Hass and B. M. Vanderbilt, U.S. Pat. 2,139,120, which is incorporated herein by reference thereto, that in the reaction of 1-nitropropane with formaldehyde, 2-nitro-1-butanol and 2-nitro-2-ethyl-1,3-propanediol tend to be produced in an equilibrium. Since these compounds are difficult to separate economically, the previous process has been to employ a large excess of the nitroalkane, of the order of 1.5–2 moles per mole of formaldehyde, when 2-nitro-1-butanol was being prepared and to recover the excess nitropropane. When the nitroalkanediol was the product sought, an excess of formaldehyde of the order of 2.2–2.5 moles per mole of 1-nitropropane was employed.

Several problems have resulted from these processes, however, in the preparation of 2-nitro-1-butanol, the recovery of excess 1-nitropropane has been poor due, at least in part, to the instability of 1-nitropropane in the presence of the alkaline catalyst. Furthermore, when the nitroalkanol was to be used for the preparation of 2-amino-1-butanol it had to be purified by vacuum distillation to eliminate problems of poor color and bad odor. The ultimate result of these processing steps is a high cost product which, though technically of great value, has heretofore been used only in specialty applications where the high cost can be absorbed.

The use of excess formaldehyde in the preparation of of 2-nitro-2-ethyl-1,3-propanediol is also disadvantageous, especially if the product is to be reduced to the corresponding amine. If the formaldehyde is allowed to enter the process, it tends to alkylate the amino group and the resulting alkylated amine is difficult to separate, yet it is objectionable because it contributes a bad odor and derivatives of the alkylated amine are highly colored. Accordingly, it has been heretofore necessary to crystallize the nitroalkanediol from the reaction medium to free it from the formaldehyde. However, the nitroalkanediol is highly soluble in water (4 g./ml. at 20° C.) so considerable losses of product occurred as a result of poor yields in the crystallization step and the difficulty and expense involved in recovery of material of suitable quality from the mother liquor.

The aminoalkanol derivatives are in ever increasing demand. Accordingly a real need has existed to supply these products in high quality and at moderate cost.

SUMMARY OF THE INVENTION

It is the object of this invention to provide an improved process for the production of alkanolamines.

It is another object of this invention to provide an improved process for the production of 2-nitro-1-butanol and 2-nitro-2-ethyl-1,3-propanediol and their corresponding alkanolamine derivatives.

Other objects of this invention will be apparent to those skilled in the art from the disclosure herein.

It has been surprisingly discovered that the disadvantages cited above are minimized or reduced by an improved process whereby a mixture of 2-nitro-1-butanol and 2-nitro-2-ethyl-1,3-propanediol are produced simultaneously in a single process, instead of separately as previously done. The mixture obtained by the improved process is suitable for hydrogenation to the corresponding alkanolamines without further purification. The improved process has the added advantage that the ratio of nitroalkanols can be controlled within limits to provide the aminoalkanols in a ratio consistent with market requirements.

According to the improved process of the present invention, 1-nitropropane and formaldehyde are reacted in a molar ratio of about 0.7 to about 0.9 of 1-nitropropane to about 1 of the formaldehyde in the presence of an alkaline catalyst to produce the mixed nitroalkanols; the nitroalkanols are then reduced by hydrogenation in the presence of sponge nickel to produce mixed 2-amino-1-butanol and 2-amino-2-ethyl-1,3-propanediol. The resulting reaction mixture is distilled at atmospheric pressure to remove water and other low-boiling compounds and is then distilled at reduced pressure to separate 2-amino-1-butanol. The 2-amino-2-ethyl-1,3-propanediol is recovered from the still residue.

This improved process has the advantages of eliminating the recovery of excess 1-nitropropane from the process for producing 2-nitro-1-butanol and eliminating the use of excess formaldehyde from the process for producing 2-nitro-2-ethyl-1,3-propanediol. The new process also eliminates the necessity for purifying these materials for the production of the corresponding aminoalkanols but without the problem of high color and bad odor which would otherwise have resulted.

DETAILED DISCUSSION

The condensation of formaldehyde with 1-nitropropane to produce the nitro alcohols is effected in accordance with the prior art except that the mole ratio of 1-nitropropane to formaldehyde is in the range of about 0.7–0.9:1. The condensation is effected by adding the formaldehyde to the 1-nitropropane in the presence of an alkaline catalyst, as is known, and preferably the alkaline catalyst is a volatile trialkyamine, e.g. trimethylamine, which can be readily separated after the reduction step. The temperatures previously used are suitable for the present process, preferably from about 30 to about 60° C.

In carrying out the process of the present invention, 1-nitropropane, catalyst and methanol are delivered to a reaction vessel equipped with an agitation means and a heating means. Advantageously, some water can be added to dissolve the catalyst. Sufficient methanol is employed to maintain a single-phase reaction mixture throughout the condensation period. The mixture is heated to reaction temperature and formaldehyde is introduced slowly with agitation. It is believed that during the addition of formaldehyde, 2-nitro-1-butanol is formed initially because of the presence of excess 1-nitropropane. After 1 mole of formaldehyde has been added, nitroethyl-propanediol formation begins.

The reaction mixture is maintained at reaction temperature for a length of time sufficient to effect substantially complete condensation, as is known to those skilled in the art. The reaction mixture is then transferred to a hydrogenation unit where the nitroalkanols are reduced to the corresponding alkanolamines by hydrogenation in the presence of sponge nickel catalyst at elevated temperatures and pressures as is known in the art. After reduction is complete, the excess hydrogen is vented and the reaction mixture is transferred to a distillation unit where water, methanol, alkylamine catalyst, if any, and other low-boiling fractions are removed by distillation, e.g. by distillation at atmospheric pressure at temperatures up to about 100° C. The pressure is then reduced to about 10 to 30 mm. and 2-amino-1-butanol and 2-amino-2-methanol-1-propanol, if any (from 2-nitropropane present as an impurity in the 1-nitropropane), are separated producing a residue of 2-amino-2-ethyl-1,3-propanediol which is useful in most applications without further purification, or it may be further refined by known methods, if preferred. The 2-amino-1-butanol as obtained from the distillation unit is usually suitable for use without further purification. When preferred, however, it can be redistilled to provide a high purity product.

The formaldehyde source employed in the practice of this invention can be the 37% aqueous formaldehyde of commerce or the 44% material or any higher concentration. Paraformaldehyde is also a suitable source of formaldehyde. The selection of formaldehyde for the process of this invention is known in the art and it is not intended that the present process be limited thereby.

The alkaline catalyst and quantities thereof suitable for use in the practice of this invention can be any of the alkaline catalysts of the prior art including, but not limited to, the hydroxides and carbonates of sodium, potassium, calcium and barium, or a volatile tertiary amine can be used. When inorganic alkaline catalysts are employed, they are separated from the nitroalkanols by means of an ion-exchange column. When a tertiary amine is used, the separation of catalyst prior to hydrogenation is unnecessary. A preferred tertiary amine is trimethylamine.

EXAMPLE 1

A mixture consisting of 411 g. of 1-nitropropane (4.6 moles) and 10 milliequivalents of potassium hydroxide was prepared in a 2-liter beaker equipped with a heating means and a stirrer. The mixture was heated to 40° C. with stirring and 487 g. of 37% formaldehyde (6 moles) was added over a period of one hour. The mole ratio of nitropropane to formaldehyde was 0.77:1. During the addition of the formaldehyde, 86 ml. of methanol was added to maintain a one-phase solution. The mixture was heated to a reaction temperature of 50° C. which was maintained for two hours. It was then passed through an ion-exchange bed to remove the potassium hydroxide.

The reaction mixture was then delivered to a hydrogenation unit containing 1200 ml. of methanol and 30 g. of Raney nickel catalyst; the unit was sealed, heated to 70° C. and pressurized with hydrogen to maintain a pressure of 600 p.s.i.g. Agitation was provided throughout and the temperature of 70° was maintained until absorption of hydrogen ceased. Hydrogen was vented from the unit and the reaction mixture was allowed to cool.

The reaction mixture was removed from the hydrogenation unit and was filtered to remove the nickel catalyst. A quantity of filtrate containing 3.8 moles of amine was transferred to a distillation flask equipped with a ¾ x 24" column and a take-off head. Distillation was carried out at a reflux ratio of 3:1 until the vapor temperature rose to about 100° C. and condensation ceased. The distillate—primarily water, propylamine (from unreacted nitropropane) and methanol—was discarded. The residue (I) in the flask weighed 727 g. and had an equivalent weight of 201.55 (3.62 moles of base). Analysis indicated that it consisted of 61 mole percent 2-amino-1-butanol and 39% 2-amino-2-ethyl-1,3-propanediol (AEPD). This residue was divided into two portions, one of 350 g. (II) and the other of 377 g. (III).

Portion (II) was transferred to a distillation flask equipped with a simple still head and connected to a vacuum line. The pressure was reduced to 13 mm. Distillation was then begun and distillate boiling up to 30° C. (mostly water) was discarded. Distillation was continued to a vapor temperature of 147° C. and liquid temperature of 157° C. The distillate, 146.6 g., had an equivalent weight of 130.5 corresponding to 1.12 mole of base. Gas chromatography assay indicated 2-amino-1-butanol 97.8 area percent, 2-amino-2-methyl-1-propanol 1.3%, unidentified 0.7%.

Residue (IV) (the AEPD) remaining in the distillation flask from the foregoing step weighed 72.5 g. and had an equivalent weight of 119.22, corresponding to 0.608 mole of base. Nuclear magnetic resonance (NMR) assay indicated less than 2% monomethyl amino-ethyl-propanediol which was unusually low compared with the product of the prior process. The permanganate time of the unrefined AEPD was 2½ minutes; the light transmittance of a 12% solution at 420 mμ was 88.2% and at 275 mμ was 12.9%.

The above residue (IV) was used as the alkanolamine in the preparation of a vinyl oxazoline drying oil from oleic acid as described by Purcell, U.S. Pat. 3,248,397. The intermediate oxazoline ester had a pale color of 2–3, Gardner scale, and the final drying oil had a mild odor and a suitable color of 6–7.

The 377 g. portion (III) of residue (I) was distilled under reduced pressure as before to remove materials (mostly 2-amino-1-butanol) distilling up to a vapor temperature of 157° at 13 mm. The resulting residue (mostly AEPD) was dissolved in water to form a 25% by weight solution and was passed through a bed of Amberlite XAD-2 non-ionic copolymer of styrene and divinyl benzene to remove color bodies. The resulting solution was concentrated at 15 mm. to a liquid temperature of 100° C. The AEPD so produced had a milder odor than the previous material and a permanganate time of more than 150 minutes; a 12% wt. solution had a light transmittance of 95.4 at 420 mμ, and 59.1% at 275 mμ. It was used to prepare a drying oil which had a color of 5, Gardner scale. The intermediate oxazoline had an improved color of 1–2.

The yield of amino-butanol based on 1-nitropropane was 57.8% and the yield of AEPD based on 1-nitropropane was 37%; the total yield was 94.8%.

EXAMPLE 2

The experiment of Example 1 was repeated in all essential details except that the 1-nitropropane was added to a mixture of the formaldehyde and 9 meq. of NaOH catalyst mixture over a period of 36 minutes at a temperature of 40° C. Then another increment of 4.5 meq. of NaOH was added.

The yield of amino-butanol (including 2-amino-2-methyl-1-propanol from the 2-nitropropane present in the 1-nitropropane) was 191 g., or 46% based on the nitropropane.

The AEPD residue remaining from distillation of amino-butanols was steam distilled at a pressure of 15 mm. Material distilling below 135° C. liquid temperature was discarded and the product was collected at 135–317° C. This product was then concentrated at 15 mm. to a liquid temperature of 125° C. A yield of 156 g.

AEPD was obtained, or 42% based on the 1-nitropropane. The total yield of amino-butanol and AEPD was 88%. The data on yields shows that the equilibrium of the reaction favored nitro-ethylpropanediol production and losses of 1-nitropropane were high.

A 50% aqueous solution of the AEPD so obtained had a light transmittance of 96.5% at 420 m$\mu$, and 10% solution had a transmittance of 16% at 275 m$\mu$. A drying oil prepared from the AEPD had a color of 8, Gardner scale, and the intermediate oxazoline had a color of 3.

EXAMPLE 3

The experiment of Example 2 was repeated in all essential details except that the mole ratio of nitropropane to formaldehyde was 0.64:1 and only 4.5 meq. of catalyst was used initially, with another 4.5 added after all the 1-nitropropane had been added. Also, a heating period of 90 minutes at 45° C. was used.

The yield of amino butanol (AB) was 33.2% based on nitropropane and the yield of AEPD was 60.2% based on nitropropane, for a total yield of 93.4%. The color of the drying oil was 6 and of the intermediate, 2–3. This example demonstrates that although adding the nitropropane to the formaldehyde shifts the equilibrium to AEPD formation, loss of 1-nitropropane can be reduced to a considerable extent by incremental addition of catalyst.

EXAMPLES 4–8

The experiment of Example 1 was repeated except that the mole ratio of 1-nitropropane to formaldehyde was varied from 0.8–0.9:1. The yields obtained were as follows:

| Example No. | Mol ratio | Yield, mole percent | | | Ratio, by wt., AB/AEPD |
|---|---|---|---|---|---|
| | | AB | AEPD | Total | |
| 4 | 0.9 | 68.9 | 17.8 | 86.7 | 2.84 |
| 5 | 0.9 | 65.8 | 21.2 | 87.0 | 2.44 |
| 6 | 0.9 | 66.4 | 19.8 | 86.2 | 2.46 |
| 7 | 0.8 | 67.2 | 28.0 | 90.2 | 1.62 |
| 8 | 0.8 | 64.7 | 28.8 | 93.5 | 1.64 |

EXAMPLE 9

The experiment of Example 1 is repeated except that trimethylamine is employed as the catalyst and the step of contacting the nitroalkanol reaction mixture with an ion-exchange resin is omitted. The alkanolamines AB and AEPD are obtained in good yield and good quality.

I claim:

1. A process for the simultaneous production of 2-amino-1-butanol and 2-amino-2-ethyl - 1,3 - propanediol consisting of the steps of:
   (a) reacting 1-nitropropane and formaldehyde at a temperature of from 30 to about 60° C. in a mole ratio of about 0.7–0.9:1 respectively, in the presence of an alkaline catalyst and sufficient water and methanol to provide a single phase solution thereby producing a mixture of 2-nitro-1-butanol and 2-nitro-2-ethyl-1,3-propanediol,
   (b) reducing said reaction mixture by hydrogenation in the presence of sponge nickel catalyst under reducing conditions of temperature and pressure,
   (c) separating low-boiling constituents by distillation at atmospheric pressure to a temperature of about 100° C.,
   (d) separating residual water by distilling at a reduced pressure of about 10 to about 30 mm.,
   (e) separating 2-amino-1-butanol by continuing distillation at reduced pressure of from 10 to about 30 mm. at a liquid temperature of about 150 to about 170° C., and
   (f) recovering 2-amino-2-ethyl-1,3-propanediol as the residue from said distillation.

References Cited

UNITED STATES PATENTS 2,139,120   12/1938   Hass et al. _____ 260—638 N

JOSEPH REBOLD, Primary Examiner

R. L. RAYMOND, Assistant Examiner

U.S. Cl. X.R.

260—635 N, 638 N, 583 M